Patented Nov. 17, 1936

2,061,186

UNITED STATES PATENT OFFICE 2,061,186

FLUORINE CONTAINING VAT DYES

John Elton Cole, Wilmington, Del., assignor to E. I. du Pont de Nemours & Company, Wilmington, Del., a corporation of Delaware No Drawing. Application December 6, 1933, Serial No. 701,240

10 Claims. (Cl. 260—49)

This invention relates to color compounds, more particularly pigments and dyes, and a process for the production thereof.

As is well known, color compounds have a wide application, for example, they are applied to cotton, linen, silk, wall paper, straw, wood, leather, feathers, hair, fats, waxes, soaps, inks, gasoline, food, condiments, varnishes, paints, oils, resins and the like. Color compounds are used as indicators in analytical chemistry, for staining microscopic preparations in histology and bacteriology, in geographic and sanitary investigations to reveal whether any connection exists between flowing waters and sewage contamination, as explosives, and in the preparation of antiseptics.

Many methods of classifying color compounds have been proposed, usually according to their uses. Structurally, they may be classified by the groups from which they derive color. These groups are generally referred to as "chromoforic" groups or "chromofores." They form initially the so-called "chromogens", or parent substances of dyes, which are converted into true dyes by the introduction of salt-forming groups. Thus, azobenzene, $C_6H_5-N=N-C_6H_5$ has a red color but is not a dye. By the introduction of salt-forming groups dyes are produced; for instance, aminoazobenzene ($C_6H_5-N=N-C_6H_4NH_2$) and hydroxyazobenzene ($C_6H_5-N=N-C_6H_4OH$) are dyes. Azobenzene is therefore a chromogen.

Among the more important organic chromoforic radicals are: the ethylene group

the carbonyl group,

and azo groups such as $-N=N-$. Any radical of a color compound containing a chromoforic group is herein referred to as a "chromoforic residue."

It is an object of the present invention to produce new and improved color compounds. Another object is to produce color compounds containing fluorine. Further objects are the production of new and improved dyes, pigments and compounds having insecticidal, bactericidal, and fungicidal properties. More specific objects are the production of new and useful vat colors and sulfur colors. A still further object is to provide new and improved processes for producing compounds of the character above described. Other objects will appear hereinafter.

These objects are accomplished according to this invention by the preparation of compounds having the following general formula:

$$R-(A)_x$$

wherein A represents $-CF_3$ or $-F$, $x$ represents an integer, and R stands for a chromoforic residue of a vat dye; that is, any vat dye residue which, when $-CF_3$ or $-F$ is replaced by $-CH_3$ or $-H$, respectively, gives the compound a color other than white and said compound may be precipitated on textile fibers in insoluble form. The term "vat dye" is defined by Georgievics and Grandmougin in "A Textbook of Dye Chemistry" (1920), particularly at page 423. The method of preparing compounds falling within the above identified general formula may vary widely, depending upon the particular type of compound.

The following examples, in which the quantities are stated in parts by weight, will illustrate some of the compounds falling within the invention and how they may be prepared.

Example I

Mix together 110 parts of p-fluoraniline, 1600 parts of water and 204 parts of concentrated hydrochloric acid, cool to 0° C. and diazotize. Add the diazo solution slowly to a solution of 250 parts of potassium xanthate, 330 parts of sodium carbonate and 1600 parts of water with efficient stirring and keeping the temperature at 75° C. to 80° C. during the addition.

Cool the resultant mixture, separate the oil and hydrolyze by the use of caustic soda in alcohol in the presence of chloracetic acid. After the hydrolysis, distil off the alcohol and filter the alkaline solution through bone black. Add hydrochloric acid to the filtrate to precipitate the pure white thioglycollic acid having the formula

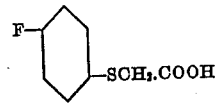

Add 37.2 parts of this thioglycollic acid to a well cooled solution of about 10 parts of ethylene dichloride in 135 parts of chlorosulfonic acid. Stir the mixture 15 hours, let it gradually come to room temperature, then drown and filter off the dye which most probably has the formula

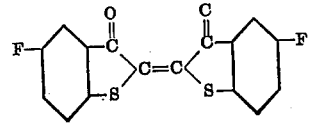

By following a similar procedure to that outlined above, fluorine substituted thioindigoid dyes may be produced from other fluorinated aryl amines, for example, as follows:

anate. Reflux the resultant mixture for five hours, then allow to cool. Filter off the white crystalline p-fluoro-phenyl-thiourea which melts within the range 163–4° C.

Table A

| Fluorinated arylamine | Color compound |
|---|---|
| Ortho-fluoraniline | 7:7'-difluoro-2:2'-bis-thionaphthene indigo. |
| Meta-fluoraniline | 4:4'- or 6:6'-difluoro-2:2'-bis-thionaphthene indigo. |
| 2:5 difluoraniline | 4:7:4':7'-tetrafluoro-2:2'-bis-thionaphthene indigo. |
| 2:4-difluoraniline | 5:7:5':7'-tetrafluoro-2:2'-bis-thionaphthene indigo. |
| 2:3-difluoraniline | 6:7:6':7'-tetrafluoro-2:2'-bis-thionaphthene indigo. |
| 3:4-difluoraniline | 5:6:5':6'- or 4:7:4':7'-tetrafluoro-2:2'-bis-thionaphthene indigo. |
| 2-fluoro-3-chloro-aniline | 6:6'-dichloro-7:7'-difluoro-2:2'-bis-thionaphthene indigo. |
| 4-fluoro-2-methyl-aniline | 5:5'-difluoro-7:7'-dimethyl-2:2'-bis-thionaphthene indigo. |
| 5-fluoro-2-methyl-aniline | 4:4'-difluoro-7:7'-dimethyl-2:2'-bis-thionaphthene indigo. |
| 4-fluoro-2-ethyl-aniline | 7:7'-diethyl-5:5'-difluoro-2:2'-bis-thionaphthene indigo. |
| 5-fluoro-2-amino-para-xylene | 4:7:4':7'-tetramethyl 5:5'-difluoro-2:2'-bis-thionaphthene indigo. |
| 4-fluoro-2-nitraniline | 5:5'-difluoro-7:7'-dinitro-2:2'-bis-thionaphthene indigo. |
| 2-fluoro-4-nitraniline | 5:5'-dinitro-7:7'-difluoro-2:2'-bis-thionaphthene indigo. |
| 4-fluoro-5-nitro-2-aminotoluene | 4:4'-difluoro-5:5'-dinitro-7:7'-dimethyl-2:2'-bis-thionaphthene indigo. |
| 2-fluoro-2-benzoylamino-aniline | 5:5'-dibenzoylamino-7:7'-difluoro-2:2'-bis-thionaphthene indigo. |
| 2-fluoro-3-benzoylamino-6-amino-toluene | 5:5'-dibenzoylamino-6:6'-difluoro-7:7'-dimethyl-2:2'-bis-thionaphthene indigo. |
| 6-fluoro-2-amino-anisole | 6:6'-difluoro-7:7'-dimethoxy-2:2'-bis-thionaphthene indigo. |
| 6-fluoro-2-amino-diphenylether | 6:6'-difluoro-7:7'-diphenoxy-2:2'-bis-thionaphthene indigo. |
| 4-fluoro-2-amino-phenetole | 4:4'-difluoro-7:7'-diethoxy-2:2'-bis-thionaphthene indigo. |
| 4-fluoro-2:5-dimethoxy-aniline | 4:4':7:7'-tetramethoxy-5:5'-difluoro-2:2'-bis-thionaphthene indigo. |
| 1-fluoro-2-naphthylamine | 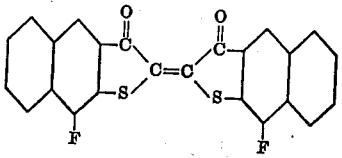 |
| 6-amino-1-fluoro-2-methoxy-naphthalene | 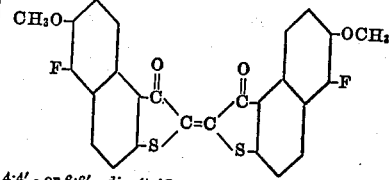 |
| 5-amino-2-fluoro-benzotrifluoride | 4:4'- or 6:6'-di-(trifluormethyl)-5:5'-difluoro-2:2'-bis-thionaphthene indigo. |
| 3-trifluormethyl aniline | 6:6'-di-(trifluormethyl)-2:2'-bis-thionaphthene indigo. |
| 2-trifluormethyl aniline | 7:7'-di-(trifluormethyl)-2:2'-bis-thionaphthene indigo. |
| 3-amino-4-fluorbenzotrifluoride | 4:4'-di-(trifluormethyl)-7:7'-difluoro-2:2'-bis-thionaphthene indigo. |
| Amino-2-chloro-1:3-di(trifluormethyl)-benzene having the formula: 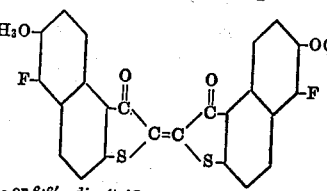 | a 2:2'-bis-thionaphthene indigo having the formula: 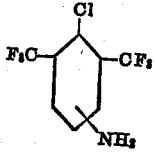 or 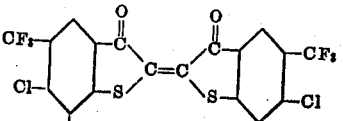 |
| 1-amino-2:5-di(trifluormethyl)-benzene | 4:7:4':7'-tetra(trifluormethyl)-2:2'-bis-thionaphthene indigo. |
| 1-amino-3:5-di(trifluormethyl)-benzene | 4:6:4':6'-tetra(trifluormethyl)-2:2'-bis-thionaphthene indigo. |
| 1-amino-3:5-difluoro benzene | 4:6:4':6'-tetrafluoro-2:2'-bis-thionaphthene indigo. |

Example II

Mix together 88 parts of p-fluoraniline, 340 parts of water, 84 parts of concentrated hydrochloric acid and 72 parts of ammonium thiocyanate. Reflux the resultant mixture for five hours, then allow to cool. Filter off the white crystalline p-fluoro-phenyl-thiourea which melts within the range 163–4° C.

Mix 84 parts of the p-fluoro-phenyl-thiourea with about 264 parts of chlorobenzene. Add slowly to this mixture through a dropping funnel a mixture of 57.0 parts sulfuryl chloride, 15.6 parts bromine and 132 parts chlorobenzene. Maintain vigorous stirring during this addition, allowing the hydrohalide gas to escape. When the reaction is complete filter off the product and dissolve it in water. Treat the water solution with bone black, filter, cool and precipitate the free base by adding ammonia. The 5-fluoro-1-amino-benzothiazol melts between 181° and 182° C.

Heat together in a bomb for five hours at about 185° C., 20 parts of 5-fluoro-1-amino-benzothiazol, 20 parts of sodium hydroxide and 120 parts of water. Then cool the bomb and treat the resultant product with 18 parts chloracetic acid in 40 parts of water.

Warm this mixture on a steam bath to 90° C., then cool and filter free from iron. To the filtrate add 8.4 parts of sodium nitrite in 20.0 parts of water. Pour this mixture slowly into 48 parts of concentrated sulfuric acid and 30 parts of ice. Keep the mixture in an ice bath, not allowing the temperature to rise over about 5° C. When the diazotization is complete neutralize with solid sodium carbonate. Add the neutralized solution slowly at 75° C. to a clear water solution of sodium cuprous cyanide made by dissolving 22.6 parts of copper sulfate crystals with 17 parts of sodium cyanide in a total volume of 300 parts.

During the addition of the diazo solution the temperature may rise to 90° C. When all of the diazo solution has been added, stir 10 minutes and add 42 parts of sodium hydroxide (flake) and 28 parts of sodium sulfide ($Na_2S.9H_2O$).

Heat the charge one hour at 90° C. and add 120 parts of sodium chloride. Cool to 15° to 20° C. and filter. Dissolve the solid in 800 parts of boiling water to which has been added 2.5 parts of 30% sodium hydroxide solution. Add bone black to the solution and filter. To the filtrate add 54 parts sulfuric acid in 160 parts of water and maintain at 80° C. one-half hour. The thioindoxyl is quite volatile. Cool and filter. The thioindoxyl produced in its keto form has the formula

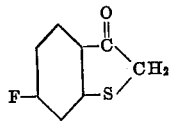

Dissolve this thioindoxyl in sodium hydroxide solution and treat the resultant solution with a solution of sodium polysulfide at 75° to 80° C. Filter the dye thus formed and wash. The dye which has the structure

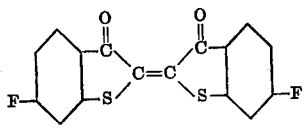

dyes cotton a bright orange shade showing exceptional fastness to light.

*Example III*

Mix 20 parts p-fluorobenzene sulfonic acid with 20 parts phosphorus pentachloride. When the reaction is finished drown in water, and wash the product by decantation. Then add the washed product to 150 parts of water in about 42 parts of concentrated hydrochloric acid, and agitate well. Add about 40 parts zinc dust and raise the temperature to 80° C. Distil the mixture through a long condenser. Treat the first 10 parts by volume of the distillate with caustic soda until it is all in solution. Add ice to the solution to a total of about 60 parts by volume. Also add 5 parts of chloracetic acid with stirring. Separate the sodium salt of the thioglycollic acid by filtering and dry it.

Add one part of the dry sodium salt of the parafluoro-phenyl thioglycollic acid to 6 parts of chlorosulfonic acid at 0°–10° C. When a test shows the thioindoxyl stage has been reached, drown the whole mass in ice and add caustic soda to distinct alkalinity. The thioindoxyl remains in solution giving a red solution. Oxidize the thioindoxyl to the dye by the addition of potassium ferricyanide. Cotton is dyed a bluish red shade by this dye.

The thioindoxyl most probably has the formula:

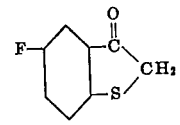

and the dye the formula:

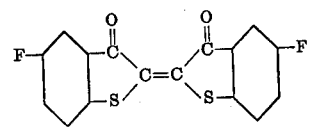

*Example IV*

Add 19 parts of alpha fluoronaphthalene to 100 parts of chlorosulfonic acid at 5° to 10° C. Drown the sulfonation product in ice, filter, and suspend the residue in 100 parts of water. Add 20 parts of zinc powder to the suspension, heat to 50° C. and add 60 parts of concentrated hydrochloric acid. Heat the mixture to boiling and steam distil.

Make the distillate alkaline with caustic soda and add 5 parts of chloracetic acid in the cold. Warm to 60° C. until there is no more thiophenol present, filter, acidify the filtrate, filter and dry the residue in air. The thioglycollic acid melts at about 103° C.

Heat 2 parts of this thioglycollic acid with 4 parts of phosphorus trichloride on a water bath, add 22 parts of chlorobenzene and then excess dry aluminum chloride. Warm a few minutes, drown in water, separate the oil, wash it with water and steam distil off the chlorobenzene. Make up the residue to 300 parts by volume in 2% sodium hydroxide at 90° C., filter hot, add potassium ferricyanide, and filter the blue black dye. This dye gives a brown color in concentrated sulfuric acid, vats to an orange or deep yellow and dyes gray.

In a similar manner beta-fluoro-naphthalene may be converted to a beta-fluoro-naphthalene thioglycollic acid melting at about 90–95° C. This thioglycollic acid may then be converted to a thioindigoid dye by the phosphorus trichloride-aluminum chloride reaction described above, yielding a dye which appears to be a pure black but dyes cotton a good brown from a sodium hydrosulfite-caustic soda vat. The dye from the beta-fluoro-naphthalene most probably has the following formula:

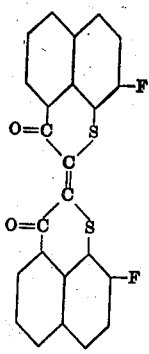

By carrying out the foregoing procedure with fluorinated naphthalenes containing one or more —CF₃ groups the corresponding trifluor-methyl naphthioindigos may be obtained. Other substituents may be present in the naphthalene nucleus as long as both of the condensable positions are not blocked.

Example V

Diazotize 100 parts of phenyl-fluoroform hydrochloride which has the formula

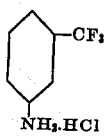

and add the diazo solution to a solution of 250 parts of potassium xanthate and 330 parts sodium carbonate in 1600 parts of water with efficient stirring and keeping the temperature at 75° to 85° C. during the entire addition. Cool the resultant mixture, separate the oil and subject it to hydrolysis by the addition of caustic soda in alcohol in the presence of chloracetic acid. After hydrolysis distil off the alcohol and filter the alkaline solution through bone black. Add an acid to the filtrate to precipitate the 3-trifluormethyl thioglycollic acid having the formula

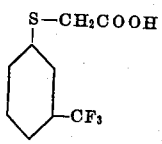

and a melting range from about 53.5° to 55° C.

Dissolve 2 parts of this thioglycollic acid in 20 parts of chlorosulfonic acid at 0° C. Agitate the mixture for 8 hours and dilute with water. The pink dye which separates may be removed by filtration. It has either of the following structures or is a mixture of dyes having these structures:

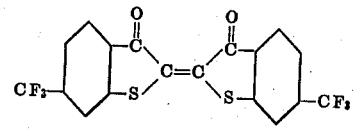

or

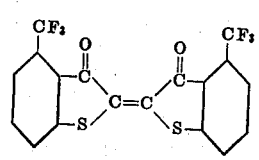

Cotton is dyed a pink shade by this dye.

Example VI

Heat together 10 parts of the hydrochloride of meta-aminobenzotrifluoride at a temperature of about 100° C. with 80 parts of sulfur chloride (S₂Cl₂) for about 30 hours. Then treat the reaction product with benzene and filter the condensation product. Treat this product with 300 parts of water for 6 hours, filter, suspend the precipitate in 30 parts of water and 30 parts of ethyl alcohol and add sodium hydroxide slowly until permanent alkalinity is established. Then treat this solution with 5 parts of sodium chloracetate in 20 parts of water. Warm the resultant solution to 90° C. for 30 minutes, filter, and cool. Add an acid and filter off the anhydride which has a melting range 230° to 231° C.

Heat 5 parts of this anhydride with 4 parts of sodium hydroxide and 8 parts of water to complete solution. Dilute the solution and add hydrochloric acid to faint turbidity. Thereafter add 1.5 parts of sodium nitrite. When this has all dissolved, add the solution to 25 parts of concentrated hydrochloric acid and 7 parts of ice. Replace the diazo group by a nitrile group and carry the product to the thioindoxyl by the well know reactions. The formula of this thioindoxyl depends on the direction the ring closed in the sulfur chloride step. It contains chlorine para to the

group, and most probably has either one or the other of the following formulas, or is a mixture of these compounds.

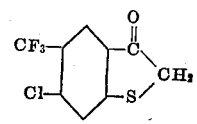

or

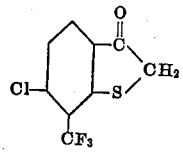

Convert the thioindoxyl to a dye by dissolving it in dilute sodium hydroxide and treating with potassium ferricyanide. The dye which gives a pink shade on cotton has either of the following structures or is a mixture of them:

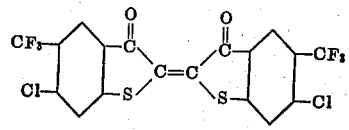

or

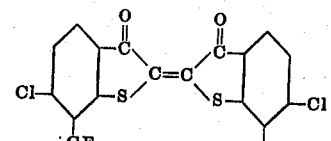

Example VII

Dissolve 16.8 parts of the thioindoxyl having the following formula

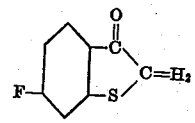

prepared in accordance with Example II in 200 parts of glacial acetic acid and add this solution with good agitation to a solution of 37.0 parts of an anil having the following probable formula

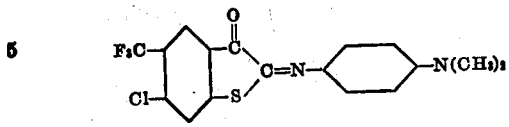

or

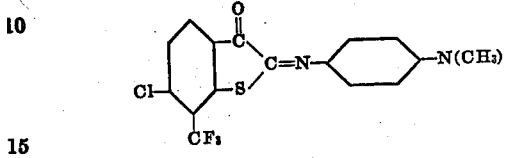

dissolved in 300 parts of glacial acetic acid. After refluxing the mixture for an hour, cool the mass, filter and wash with alcohol. The scarlet dye formed has either one of the following formulae or is a mixture of them:

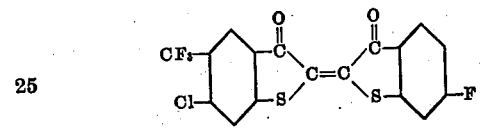

or

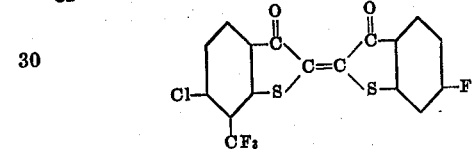

In a similar manner other unsymmetrical fluorine containing dyes of the thioindigoid series can be prepared. They may contain fluorine on either one or both sides of the thionaphthene residue. The anil of either component may be used in the synthesis, it being only a matter of choice which way the condensation is carried out. It is obvious also that other reaction media than glacial acetic acid might be used to advantage in some cases. The following table is illustrative of further reactions of this type:

Table B

| Fluorinated thioindoxyl | Reacted with the 2-para dimethyl anilide of— | Color compound |
|---|---|---|
| 6-fluorthioindoxyl | Thioindoxyl | 6-fluor-2:2'-bis-thionaphthene indigo. |
| 6-trifluormethyl-thioindoxyl | Thioindoxyl | 6-trifluormethyl 2:2' bis-thionaphthene indigo. |
| 5-fluorthioindoxyl | 6-fluorthioindoxyl | 5:6'-difluoro-2:2'-bis-thionaphthene indigo. |
| 6-fluorthioindoxyl | 6-trifluormethyl-thioindoxyl | 6-fluor-6'-trifluormethyl-2:2'-bis-thionaphthene indigo. |
| Fluorthioindoxyl of Example IV | Thioindoxyl | 6-chlor-4- or 7-trifluormethyl-2:2'-bis-thionaphthene indigo. |
| Fluorthioindoxyl of Example IV | 3-hydroxy-4-methyl-6-chloro-thionaphthene. | 6:6'-dichloro-4- or 7-trifluormethyl-4'-methyl-2:2'-bis-thionaphthene indigo. |
| 5-fluorthioindoxyl | 3-hydroxy-4-methyl-6-chloro-thionaphthene. | 5-fluor-4'-methyl-6'-chloro-2:2'-bis-thionaphthene indigo. |

*Example VIII*

Mix together the following ingredients and boil under reflux:

| | Parts |
|---|---|
| Thioindoxyl of Example II | 33.2 |
| Acenaphthequinone | 32.4 |
| Ethyl alcohol | 400.0 |

Add 1.7 parts of piperidine, whereupon condensation takes place. Filter the dye and wash. The formula of this dye is most probably:

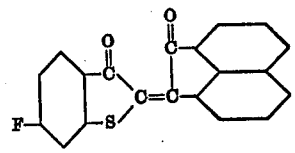

*Example IX*

Dissolve 33.6 parts of the fluorthioindoxyl of Example II in 110 parts of chlorobenzene and add to this solution a solution of dibrom isatin chloride prepared from:

| | Parts |
|---|---|
| Dibrom isatin | 60 |
| Phosphorus pentachloride | 25.6 |
| Chlorobenzene | 222.0 |

The precipitated dye most probably has the structure:

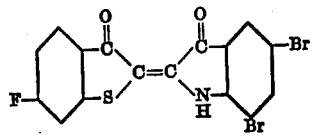

*Example X*

Heat together to the boil 9 parts of the thioindoxyl prepared as in Example VI, 6 parts of acenaphthequinone and 400 parts of alcohol under reflux. Then add a few drops of piperidine. The precipitated dye has either of the following structures:

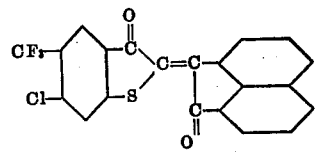

or

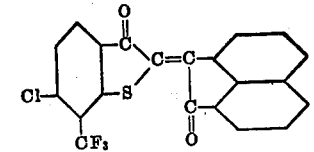

This dye gave an orange-pink shade on cotton.

Example XI

Mix together 5 parts of the thioindoxyl prepared as in Example VI and 11 parts of chlorobenzene and add the mixture to a solution of dibrom isatin chloride prepared from:

| | Parts |
|---|---|
| Dibrom isatin chloride | 6 |
| Pentachloride of phosphorus | 6 |
| Chlorobenzene | 66 |

The formation of dye occurs quickly, but the dye is quite soluble in the solution. Filter the insoluble portion of dye and dry. The structure of this dye is most probably:

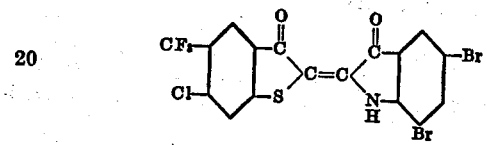

or

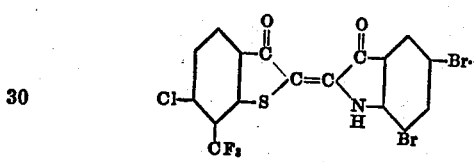

Example XII

Mix together the following substances and stir until dissolved:

| | Parts |
|---|---|
| Chloral hydrate | 90 |
| Water | 1925 |
| Anhydrous sodium sulfate | 575 |

To the resultant solution add a solution of 89 parts m-amino phenyl fluoroform hydrochloride, 300 parts water and 3.5 parts hydrochloric acid. This addition causes a white precipitate. Treat the product with 110 parts hydroxyl amine hydrochloride and 500 parts water.

Heat this mixture at such a rate that the boiling takes place in about 45 minutes. Then heat at the boil for one-half hour and allow to stand for 24 hours. The solid material which is filtered off is trifluormethyl isonitroso acetanilide, which has a melting range 144° to 146° C. and the following structure:

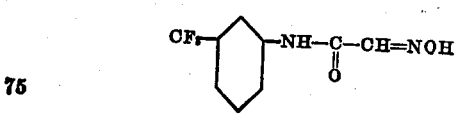

Add 10 parts of this trifluormethyl isonitroso acetanilide to 72 parts of concentrated sulfuric acid at 50° to 60° C. Maintain the temperature at 50° to 60° C. for 14 hours and then stir the mixture for 72 hours at room temperature and drown on ice. Filter and dry the trifluormethyl isatin. By analysis the nitrogen content is about 6.9%. The melting range is 203° to 204° C. This product most probably has one of the formulas:

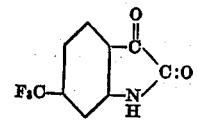 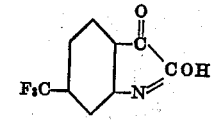

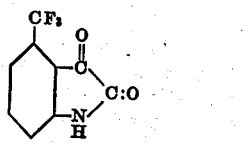 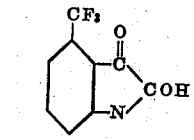

Warm together 12.5 parts of trifluormethyl isatin, 12.5 parts of phosphorus pentachloride and 82 parts of chlorobenzene until complete solution has occurred. Then pass hydrogen sulfide through the solution until complete formation of the dye. The dye is quite soluble in the solvent and has a very greenish shade of blue. The structure is either or both of the following:

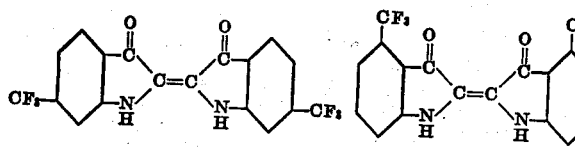

Example XIII

Warm together the following substances until complete solution occurs:

| | Parts |
|---|---|
| Trifluormethyl isatin of Example XII | 3.3 |
| Pentachloride | 4.2 |
| Chlorobenzene | 42.0 |

Add to this solution a solution of 4 parts of 3-hydroxy-4-methyl-6-chloro-thionaphthene in 66 parts of chlorobenzene. Condensation occurs giving a violet color completely soluble in the solvent. Remove the solvent by steam distillation. Acid paste the residue and drown. The resultant color has a reddish-violet shade and has either or both of the following structures:

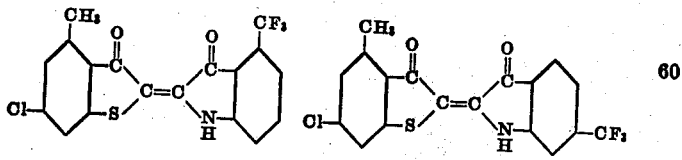

By a procedure similar to that given in Example X, starting with meta-fluoraniline instead of meta-benzo-trifluoride, an isatin having fluorine substituted in either the 4- or 6- positions or possibly a mixture of 4- and 6- fluorisatins is obtained. Starting with para-aminobenzotrifluoride, 5-trifluormethyl isatin may be obtained. Similarly, any of the fluorinated arylamines given in Table A may be converted to the corresponding isatins. These latter in reactive form, as for example, the chloride or anilide, may then be condensed to the dyes as previously described. Further specific examples are as follows:

Table C

| Fluorinated reactive isatin derivative of— | Combined with— | Color compound |
|---|---|---|
| Trifluormethyl isatin of Example XII | 6-fluorthioindoxyl | 6-fluor-4'- or 6'-trifluormethyl - 2 - thionaphthene-2'-indolindigo. |
| Do | 5-fluorthioindoxyl | 5-fluor-4'- or 6'-trifluormethyl - 2 - thionaphthene-2'-indolindigo. |
| Do | Dibrom isatin | 5:7-dibrom-4'- or 6'-trifluormethyl-2:2'-bis-indolindigo. |
| Do | 6-trifluormethyl-thioindoxyl | 6-trifluormethyl-4'- or 6'-trifluormethyl - 2 - thionaphthene - 2' - indolindigo. |
| Do | 5-trifluormethyl-thioindoxyl | 5-trifluormethyl-4'- or 6'-trifluormethyl - 2 - thionaphthene - 2' - indol - indigo. |
| Do | Thioindoxyl of Example VI. | 4-chloro-5- or 7-trifluormethyl-4'- or 6'-trifluormethyl - 2 - thionaphthene - 2'-indolindigo. |
| Do | Isatin | 4- or 6-trifluormethyl-2:2'-bis-indolindigo. |
| Do | Acenaphthequinone | 4- or 6-trifluormethyl-2-indol-acenaphthene indigo. |

Example XIV

Heat together to boiling for some hours 24.7 parts of ortho-tolu-5-hydroxy-alpha-naphthocarbazole and 23.4 parts of trifluormethyl isatin-2-chloride in 250 parts of acetic anhydride.

The resultant dye most probably has one of the following formulas:

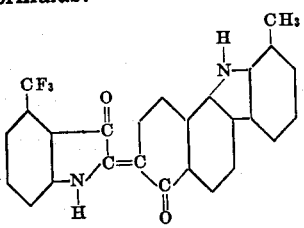

or

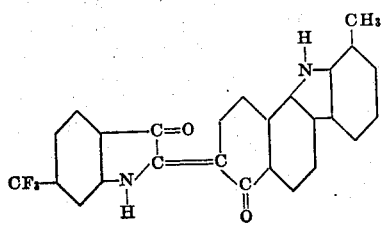

Example XV

Reflux 290 parts of trifluormethyl isatin-2-anilide with 25 parts of ortho-tolu-5-hydroxy-alpha-naphtho-carbazole in the presence of 250 parts of acetic anhydride. After cooling, filter off the dye and wash with alcohol. The dye corresponds to that described in Example XIV.

By procedures similar to those described in Examples XIV and XV, other indigoid dyes of this type may be prepared. Dyes of this type, in general, are especially suitable for printing.

Further examples of specific reactions which may be carried out similarly to produce fluorinated color compounds of this type are listed in Table D below:

Table D

| Isatin-2-derivative | Hydroxy compounds |
|---|---|
| Trifluormethyl-isatin-2-anilide | Ortho-tolu-5-hydroxy-beta-naphthocarbazole. |
| Do | Phenyl-5-hydroxy-alpha-naphthocarbazole. |
| Do | Phenyl-5-hydroxy-beta-naphthocarbazole. |
| Do | N-methyl-1:2-(1'-hydroxy benzo)-carbazole. |
| Do | 5-hydroxy-1-(alpha or beta)-anthraquinonyl-naphthylamines |
| Do | 5-hydroxy-2-(alpha or beta)-anthraquinonyl-naphthylamines. |
| Do | 6-hydroxy-2-phenyl-1:3 naphthimidoazole. |
| Do | 2-benzoylamino-5-hydroxy-naphthalene. |
| 5-fluoroisatin-2-anilide | Ortho-tolu-5-hydroxy-alpha-naphthocarbazole. |
| Do | Ortho-tolu-5-hydroxy-beta-naphthocarbazole. |
| Do | Phenyl-5-hydroxy-alpha-naphthocarbazole. |
| Do | Phenyl-5-hydroxy-beta-naphthocarbazole. |

Fluorinated thionaphthenes may likewise be condensed with the hydroxy-amino derivatives listed above. Thus, the 6-fluorthioindoxyl of Example I, the 6-chlor-5-(or 7-)trifluormethyl-thioindoxyl of Example VI, 5-fluorthioindoxyl, 4-trifluormethyl thioindoxyl, 5-trifluormethyl thioindoxyl, 6-trifluormethyl thioindoxyl, or 7-trifluormethyl thioindoxyl may be reacted with any of the foregoing hydroxy-amino derivatives under the influence of a suitable condensing agent to produce thioindigoid dyes.

The naphthocarbazole compounds produced by condensation of the reactive fluorinated isatin-2-derivatives and fluorinated thioindoxyls with pheno-hydroxy-naphthocarbazoles may be given the general formula:

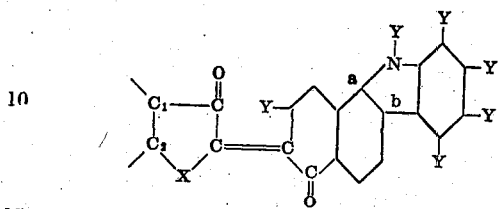

wherein X represents S or NH, $C_1$ and $C_2$ are carbon atoms belonging to an aryl nucleus which contains fluorine and may contain other substituents, Y represents hydrogen or a monovalent substituent, and the nitrogen atom in the carbazole ring can be attached to either the alpha or beta position of the hydroxy naphthalene residue.

In general, the indigoid colors herein described may be given the formula:

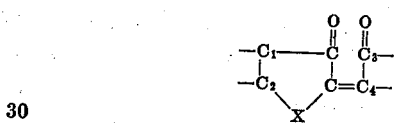

in which X represents S or NH, $C_1$ and $C_2$ are part of a fluorinated ring system, and $C_3$ and $C_4$ are part of an organic ring system that may contain fluorine.

Vat dyes of the anthraquinone series may be prepared from intermediates originally containing fluorine. Thus, by ring-closing 1-fluoro-o-benzoyl-benzoic acid with sulfuric acid, then nitrating and reducing the resultant product, a mixture of amino-fluoro-anthraquinones may be prepared yielding, when isolated, substances which apparently correspond to 2-amino-3-fluoro-anthraquinone and 1-amino-2-fluoro-anthraquinone.

Similarly, starting with p'-trifluormethyl-o-benzoyl-benzoic acid, 2-amino-3-trifluormethyl anthraquinone and 1-amino-2-trifluormethyl-anthraquinone may be obtained. Other fluorinated o-benzoyl-benzoic acids having at least one position in the benzoyl nucleus ortho to the

group free may be employed.

The alpha- and beta-amino-fluor-anthraquinones may be alkylated, aralkylated, arylated, or acylated by well known methods to produce the corresponding N-alkyl, N-aralkyl, N-aryl and aryl-amine derivatives, e. g., N-methyl-, N-dimethyl-, N-ethyl-, N-diethyl-, N-benzyl-, N-tolyl-, N-tolylsulfonic acid-, acetylamino-, and benzoyl-amino-anthraquinone derivatives containing fluorine.

The color compounds herein described have a wide application which will vary with any given compound. In particular, many of these compounds are useful as dyes. Until the present invention no dyes were known in which a halogen was present as a substituent in an alkyl group or in which fluorine was present at all. Such groups, for example, as —$CH_2Cl$, —$CCl_3$, while they are well known in organic chemistry, are never used as substituents in finished dyes. The reason for this is well known to any organic chemist, namely, these groups are too readily hydrolyzed to the corresponding oxy compounds. For example, benzotrichloride is easily hydrolyzable to benzoic acid and this reaction is general for this group, although the —$CCl_3$ group may be attached to a residue much more complicated than the phenyl radical.

It has been found that the fluorine and —$CF_3$ groups are very stable insofar as dyestuff chemistry is concerned, and this observation makes possible the use of such groups in all types of dyes. The importance of this observation is apparent to the dyestuff chemist because, for the first time, it is now possible to obtain dyes with a halogen atom in the aliphatic auxochromic group or, to look at the matter from another point of view, it is now possible to have as an auxochromic group, a carbon atom in a high state of oxidation, whereas heretofore the dyestuff chemist has been largely confined to a highly reduced carbon atom as the —$CH_3$ group.

The fluorine and —$CF_3$ groups when used as substituents in dyestuffs, not only (as indicated above) affect the shade of the dyes but also alter their general fastness properties, as well as their other physical and chemical characteristics. By the use of these substituent groups, dyes can be obtained that exhibit good oil solubility, which is very important for certain types of gasoline colors. Furthermore, the peculiar properties of the fluorine substituted dyes and particularly those containing the —$CF_3$ group, makes them important for uses other than as dyes. As examples of especially valuable applications of these compounds should be mentioned their use in pharmacy, as well as in the fungicidal, bactericidal, and insecticidal fields.

As many apparent and widely different embodiments of this invention may be made without departing from the spirit thereof, it is to be understood that I do not limit myself to the foregoing examples or description except as indicated in the following claims.

I claim:

1. Color compounds having the formula:

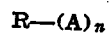

wherein n represents an integer and A represents —$CF_3$ or —F attached to an aryl nucleus which is part of a vat dye residue R.

2. Color compounds having the formula:

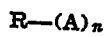

wherein n represents an integer and A represents —$CF_3$ or —F attached to an aryl nucleus which is part of an indigoid residue R.

3. A color compound having the formula:

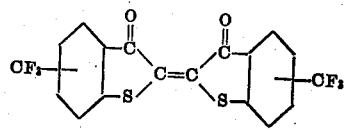

which dyes cotton a pink shade.

4. Vat dyes containing in their aromatic nuclei at least one radical selected from the group consisting of —F and —$CF_3$.

5. Vat dyes containing in their aromatic nuclei at least one —$CF_3$ group.

6. A water-insoluble indigoid vat dye containing as a substituent in an aromatic nucleus thereof at least one —$CF_3$ group.

7. Color compounds of the indigoid type having a thionaphthene nucleus containing as substituents in the aromatic portion thereof at least one radical selected from the group consisting of —F and —$CF_3$.

8. Color compounds of the indigoid type having a thionaphthene nucleus containing as substituents in the aromatic portion thereof at least one —CF3 group.

9. A compound having the following general formula

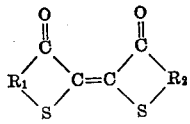

in which R1 and R2 represent radicals of the benzene series connected to the remainder of the molecule by valence bonds from adjacent carbon atoms and at least one of which contains as a substituent at least one radical selected from the group consisting of —F and —CF3.

10. A compound having the following general formula

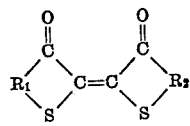

in which R1 and R2 represent radicals of the benzene series connected to the remainder of the molecule by valence bonds from adjacent carbon atoms and at least one of which contains as a substituent at least one —CF3 group.

JOHN ELTON COLE.